United States Patent [19]

Schneider

[11] Patent Number: 5,562,148
[45] Date of Patent: Oct. 8, 1996

[54] PROCESS FOR CASTING A METAL

[75] Inventor: James T. Schneider, Dublin, Ohio

[73] Assignee: Ashland Inc., Columbus, Ohio

[21] Appl. No.: 366,286

[22] Filed: Dec. 29, 1994

Related U.S. Application Data

[63] Continuation-in-part of Ser. No. 40,171, Mar. 30, 1993, abandoned.

[51] Int. Cl.$^6$ ........................... B22D 33/04
[52] U.S. Cl. ........................... 164/137; 164/339
[58] Field of Search ........................... 164/137, 339

[56] References Cited

U.S. PATENT DOCUMENTS

| | | | |
|---|---|---|---|
| 4,552,934 | 11/1985 | Rabito et al. | 525/458 |
| 4,724,892 | 2/1988 | Schneider et al. | 164/137 |
| 5,143,996 | 9/1992 | Chung et al. | 528/60 |

Primary Examiner—Joseph J. Hail, III
Assistant Examiner—I.-H. Lin
Attorney, Agent, or Firm—David L. Hedden

[57] ABSTRACT

This invention relates to a process for casting a metal which uses assemblies of foundry shapes. The foundry shapes are held together with a solventless adhesive paste having urethane linkages. The foundry adhesive paste is a two component system comprising a prepolymer in the Part I and a curative in the Part II.

4 Claims, No Drawings

PROCESS FOR CASTING A METAL

CROSS REFERENCE TO RELATED APPLICATIONS

This application is a continuation-in-part of Ser. No. 08/040,171 filed on Mar. 30, 1993 and now abandoned.

TECHNICAL FIELD OF THE INVENTION

This invention relates to a process for casting a metal which uses assemblies of foundry shapes. The foundry shapes are held together with a solventless adhesive having urethane linkages. The adhesive is a two component system comprising a prepolymer in the Part I and a curative in the Part II.

BACKGROUND OF THE INVENTION

A number of requirements have been recognized for the use of adhesive pastes to hold foundry shapes in an assembly. These are generally met by adhesive pastes which are based upon polymers having urethane linkages.

These requirements include the need for a separate hydroxyl and isocyanate component each having a viscosity in the range of about 20,000 to about 50,000 centipoise (cps). Similar viscosities for the hydroxyl component and isocyanate component are desirable because the adhesive paste is applied as a mixture by extrusion through a single applicator gun having a mixing chamber a short distance upstream of an outlet nozzle. An adhesive paste in this consistency range can be readily mixed and extruded through such an applicator using pressures in the range of about 20 to 100 psi.

Another requirement is that the adhesive paste have a time period of workability (gel time) of at least two to three minutes. It also is desirable to have a cure time over which the paste reaches at least 70–80% of its final tensile strength in about 10–30 minutes after application to a foundry shape. This intermediate tensile strength preferably is in the range of about 100 to 150 psi, preferably at least about 125 psi.

In addition to holding foundry shapes together, the adhesive paste should also adhere to metal parts and to the foundry mix used in making mold assembly. Furthermore, since such the mold assembly and other parts may be treated by dipping in a water based solution after adhesion and then heated to a temperature of about 275° F. for about one hour after assembly, the adhesive paste must resist breakdown under the conditions of water treatment and subsequent drying.

U.S. Pat. No. 4,692,479 describes such an adhesive paste. Such adhesive pastes have worked effectively, but they are typically catalyzed with lead catalysts and there is an interest in avoiding the use of such catalysts. They also require solvents in the hydroxyl component and polyisocyanate component.

SUMMARY OF INVENTION

This invention relates to a process for casting a metal comprising:

A. fabricating a molding assembly by applying an adhesive paste to a least two foundry shapes, wherein said shapes are made of foundry aggregate held together with a foundry binder, so as to bond said foundry shapes together as a molding assembly, wherein the adhesive paste comprises:

I. a solventless Part I component comprising:
    A. a prepolymer having from 3 to 15 percent free isocyanate groups comprising the reaction product of a polyol and an aromatic polyisocyante;
    B. an aliphatic polyisocyanate; and
    C. a thixotropic filler;
  II. a solventless Part II component comprising:
    A. a curative comprising:
      (1) a polyether polyol; and
      (2) a diamine; and
    B. a thixotropic filler;

B. pouring said metal while, in the liquid state, into or around said molding assembly;

C. allowing said metal to cool and solidify so as to provide a formed metal article; and D. separating said metal article from said molding assembly.

The adhesive used in the process is a two component, solventless system which does not use a lead catalyst.

BEST MODE AND OTHER MODES

For purposes of this disclosure, the term "foundry shape" and shall include molds, cores, and other shapes made of foundry aggregate and a chemically reactive binder system. A "molding assembly" means an assembly of foundry shapes held together by an adhesive paste. The adhesive paste is the reaction product of the Part I which contains the prepolymer and the Part II which contains the curative.

The preferred polyol ingredient of the prepolymer of the Part I component is described in U.S. Pat. No. 4,552,934 where about 100 parts of an active hydrogen containing material having a molecular weight of 700 to 4500, preferably from about 1000 to 3500, is reacted with 30 to 120 parts of an organic polyisocyanate as a mixture of aromatic organic polyisocyanates. Usually, a reaction time at elevated temperature is chosen to give a prepolymer in one to several hours. These prepolymers usually have from 3 to 15 percent free isocyanate with 7 to 10 percent free isocyanate being preferred.

The active hydrogen containing material in the prepolymer component of the Part I component may be 700 to 4,000 molecular weight polypropylene oxide ether diol, polyethylene oxide polypropylene oxide ether diol, polytetramethylene ether glycol, polyepsilon caprolactone diol, polycarbonate diol, polybutadiene diol or mixtures of these diols. The preferred active hydrogen containing material is a polypropylene oxide ether diol of 2000 molecular weight.

The second ingredient of the prepolymer is an aromatic polyisocyanate. Among the useful aromatic polyisocyanates are: polymethylene polyphenyl isocyanate, 2,4-toluene diisocyanate, 2,4–2,6 (80/20) toluene diisocyanate, 4,4'-diphenylmethane diisocyanate, 1,4-phenylene diisocyanate, 3,3'-dimethoxy -4,4'-biphenyl diisocyanate, 3,3'-dimethyl-4, 4'-biphenyl methane diisocyanate, or mixtures of these diisocyanates. One preferred aromatic polyisocyanate is a modified diphenyl methane diisocyanate available as Isonate 143L isocyanate from Upjohn Polymer Chemicals, La Porte, Tex. This modified diphenyl methane diisocyanate contains a high percentage of pure diphenylmethane diisocyanate and a lesser amount of polycarbodiimide adducts.

Also preferred is the polymethylene polyphenyl isocyanate available as Mondur MRS isocyanates from Mobay Chemical Corporation, Pittsburgh, Pa. The most preferred aromatic polyisocyanate in the prepolymer is a mixture of Isonate 143L isocyanate and Mondur MRS isocyanate.

Part I also contains an aliphatic organic polyisocyanate typically having aliphatic carbon atoms adjacent to the isocyanate groups. These aliphatic carbon atoms are thus alpha to the isocyanate groups. There may be aromatic functionality elsewhere in the organic polyisocyanate, but these compounds are referred to herein as aliphatic isocyanates because of the aliphatic nature of the carbon atom alpha to the isocyanate groups. These alpha carbon atoms may be primary, secondary or tertiary, that is, either they may have, respectively two, one or no hydrogen atoms; and may be linear or part of a cyclic chain. In addition to the aromatic functionality, the aliphatic isocyanates used in this invention may contain other functional groups compatible with the aliphatic isocyanate, such as unsaturation, ether, mercapto, carbonyl, carbonyl, ester, halogen, etc.

Among the preferred aliphatic organic polyisocyanates are:
isophorone diisocyanate (IPDI), bis (4-isocyanatocyclohexyl) methane (Desmondur W), m-xylylene diisocyanate (MXDI), 1,3-bis(isocyanatomethyl) cyclohexane (1,3-BIC), m-tetramethyl xylene diisocyanate (m-TMXDI), dimethyl-p-isopropenyl benzyl isocyanate (p-TMI), 1,4-cyclohexane diisocyanate (CHDI) trimethyl hexamethylene diisocyanate (TMDHI), 2-isocyanato ethyl 2,6 diisocyanatohexanoate (T-100), polyurea derivative of 1,6-hexamethylene diisocyanate (Desmondur N 3200), a trimer derivative of 1,6-hexamethylene diisocyanate (Desmondur N- 3300), and low viscosity aliphatic isocyanate (Desmondur KL5- 2550).

The more preferred aliphatic organic polyisocyanates useful are trimethyl hexamethylene diisocyanate (TMXDI), an aliphatic diisocyanate based on a long chain dimerized fatty acid backbone containing 36 carbon atoms, Henkel Corporation, La Grange, Ill. (DDI 1410 diisocyanate), Desmodur N 3200 diisocyanate, isophorone diisocyanate (IPDI) and m-xylene diisocyanate (MXDI). The most preferred aliphatic isocyanate in the practice of this invention is m-xylylene diisocyanate (MXDI). In the preferred embodiment of this invention from 0.5 to 6.0 parts by weight of aliphatic isocyanate or mixtures of isocyanates are used with 100 parts combined prepolymer and curative. In the more preferred embodiment of this invention from 1 to 4 parts by weight aliphatic isocyanate are used with 100 parts combined prepolymer and curative.

The other ingredient in the Part I component is a filler. The filler is preferably a hydrophobic filler and is preferably a thixotropic agent. However, the amount of the filler depends on the viscosity desired for the prepolymer and the curative. The viscosity of each component should be such that the filler does not separate out upon prolonged standing in storage. The viscosity of both the prepolymer and the isocyanate component should be in the range of 4,000 to 60,000 cps, preferably 20,000 to 40,000 cps, more preferably 30,000 to 40,000 cps. This usually requires the inclusion of 4 to 30 weight percent, preferably 4 to 11 weight percent of filler, said weight percent based upon the total weight of the Part I component.

The stability should be such that the filler does not cause any adverse or premature reaction with the other constituents of the component in which it is placed. For example, a filler that contains water molecules or an ingredient that reacts to produce water molecules should not be placed in the prepolymer since the isocyanates in the prepolymer man undergo a cross-linking reaction with water.

Representative examples of inert powdery fillers are: aluminum silicates, carbon black, talcs (magnesium silicates), calcium carbonate, calcium silicates, barium sulfates, graphite, or mixtures of fillers. The preferred fillers are talc and fumed silica available as Aerosil 200 fumed silica from Degussa Inc., New York, N.Y.; and Kaofile 2 thickener, a surface modified kaolinite (aluminum silicate) from Georgia Kaolin Company, Union, N.J.

The Part I component may also include catalysts such as zinc stearate and antioxidants such as Irganox 1010 antioxidant available from Ciba Geigy Corporation, Ardsley, N.Y.

The curative component of the adhesive paste is a mixture comprising a polyether polyol, a diamine, an optional urethane catalyst, and an optional thickening agent.

The first ingredient of the curative is a polyether polyol having a functionality of 1.8 to 6.0 and a hydroxyl number from 100 to 1200. A hydroxyl number range of 200 to 700 and a functionality range of 3 to 5 are preferred. Suitable active hydrogen containing materials include diols, triols and tetrols, having primary, secondary and/or tertiary alcohol groups. Among the preferred polyether polyols are: Pluracol PeP 550 polyol, a propoxylated derivative of pentaerythritol having four secondary hydroxyl groups and a hydroxyl number of 450 available from BASF Wyandotte Corporation, Parsippany, N.J.; Pluracol P-344 polyol, an ethoxylated, propoxylated derivative of ethylene diamine having about 80% of its hydroxyl groups as primary and having a hydroxyl number of 450, also available from BASF Wyandotte Corporation; Thanoi R470X polyol, available from Texaco Chemical Co., Bellaire, Tex., a propoxylated derivative of diethanolamine with a functionality of about 4 and a hydroxyl number of 500; Thanol SF-265 polyol, also available from Texaco Chemical Co., a propoxylated derivative of triethanolamine with a functionality of about 3 and a hydroxyl number of 600; and Dianol 2210 polyol, an ethoxylated derivative of bisphenol-A with a functionality of 2 and a hydroxyl number of 280, available from Akzo Chemie America, Chicago, Ill.

The second ingredient of the curative component is a diamine. Suitable diamines include: m-phenylene diamine, p-phenylene diamine, 4,4'-methylene dianiline, 4,4'-diaminodiphenyl sulfone, piperazine, 2,6-diaminopyridine, p,p'-methylene bis (orthochloroaniline), amino ethyl piperazine, isophoronediamine, diethyltoluene diamine, ethylene diamine, 1,3 diaminopropane and mixtures of these organic diamines. The preferred diamines are piperazine, diethyl toluene diamine (DETDA), and Jeffamine D400 diamine, a polyoxypropylene diamine, available from Texaco Chemical Co., Houston, Tex. From 0.5 to 10.0 parts diamine are used in 100 parts curative.

Both the Part I and Part II components contain a filler. The filler is preferably a hydrophobic filler and is preferably a thixotropic agent. The amount of the filler depends on the viscosity desired for the prepolymer and the curative. The viscosity of each component should be such that the filler does not separate out upon prolonged standing in storage. The viscosity of both the prepolymer and the isocyanate component should be in the range of 4,000 to 60,000 cps, preferably 20,000 to 40,000 cps, more preferably 30,000 to 40,000 cps. This usually requires the inclusion of 4 to 30 weight percent, preferably 4 to 11 weight percent of filler, said weight percent based upon the total weight of the Part I component, and the inclusion of 5 to 40 weight percent, preferably 15 to 30 weight percent of filler in the Part II component, said weight percent based upon the total weight of the Part II component The stability should be such that the filler does not cause any adverse or premature reaction with the other constituents of the component in which it is placed. For example, a filler that contains water molecules or an ingredient that reacts to produce water molecules should not be placed in the prepolymer since the isocyanates in the prepolymer man undergo a cross-linking reaction with water.

Representative examples of inert powdery fillers are: aluminum silicates, carbon black, talcs (magnesium silicates), calcium carbonate, calcium silicates, barium sulfates, graphite, or mixtures of fillers. The preferred fillers talc and fumed silica available as Aerosil 200 fumed silica from Degussa Inc., New York, N.Y.; and Kaofile 2 thickener, a surface modified kaolinite (aluminum silicate) from Georgia Kaolin Company, Union, N.J.

An optional third ingredient of the curative component is a catalyst to facilitate the reaction between active hydrogen containing compounds and isocyanates. Suitable catalysts include tertiary amines and metallic catalysts including dibutyltin dilaurate, dibutyltin diacetate, ferric acetyl acetonate, nickel acetylacetonate, dibutyltin dialkyl acid, stannous octoate, dibutyltin diiso-octyl mercapto acetate, and mixtures of these catalysts. The preferred organo metallic catalyst is the dibutytin dialkyl acid catalyst known as Dabco 125 catalyst available from Air Products, Allentown, Pa. The preferred tertiary amine catalyst is 1,4-diazabicyclo octane known as Dabco triethylene diamine catalyst also available from Air Products. Conventional catalytic amounts of organotin catalyst and tertiary amine catalyst are optionally used in the curative component. From about 0.1 parts by weight to 3 parts by weight organotin catalyst and from about 0.3 parts by weight to about 0.6 parts by weight amine catalyst are optionally used in 100 parts adhesive.

Small amounts of other optional materials may also be added to the curative. These include coloring agents, for example, Stantone HCC 6783 green coloring agent from Harwick Chemical Company, Akron, Ohio, which is a blend of C.I. Pigment Green #7 and C.I. Pigment Black #7 dispersed in a polyoxypropylene polyol at 17.8 parts of pigment to 82.2 parts polyol. From 1.5 to 3.0 parts of an aromatic diisocyanate such as toluene diisocyanate may also optionally be included in the curative.

The weight ratio of the prepolymer to curative is generally from 10:1 to 1:2, preferably about 4:1. Thus, in a preferred embodiment of this adhesive, there are 70 to 85 parts prepolymer, 0.5 to 6.0 parts aliphatic isocyanate and the remainder curative.

In order to make the adhesive paste, Part I is first prepared by reacting the excess aromatic polyisocyanate with polyol. Next the aliphatic organic polyisocyanate and filler is blended with the prepolymer to make the Part I. Part II is made by blending the curative with the filler.

The Part I and Part II components are preferably mixed simultaneously by conventional mixing and applicator gun equipment. Equipment designed for preparation of liquid silicone rubber may readily be adapted for mixing and application of the adhesive paste of the invention. One such mixing assembly is a model S4-5 meter-mix machine with a model 12004-X applicator gun available from Fluid Atomation, Inc., of Wixom, Mich. Another meter, mix and dispense machine usable with the invention is the Posiratio Machine with a hand held Posimixer applicator gun available from Liquid Control Corporation of North Canton, Ohio. A completely portable applicator system for mixing and applying the adhesive paste of the invention is a high pressure dispense gun utilizing a single cartridge with two separate chambers, one for the prepolymer component and the other for the isocyanate component, and having a mixing tube downstream of these two chambers. One such dispensing gun is the Supermix II also available from Liquid Control Corporation.

The mixed paste remains in the form of a workable liquid for about 20% to about 60%, preferably about 40% to about 50%, of its curing time, depending on the catalyst used. This provides working time for applying the paste, positioning the pieces to be assembled, and then pressing together the pieces into the molding assembly. The glued assembly then cures to form a thermally stable, securely bonded molding assembly into which or around which a molten metal may be poured for casting metal shapes.

The strength of the adhesive bond achieved between the foundry shapes is sufficient to eliminate the use of mechanical fasteners, weights and other mechanical hardware for holding the shapes together during the casting of liquid metal. The high tensile strength, heat resistance, and swelling resistance of the cured adhesive paste prevents slipping or shifting of the foundry shapes during oven treatment and metal pouring. The adhesive paste can be readily applied as spots or beads according to the job requirements.

The adhesive paste of the invention is useful at or near room temperature (60° F.–80° F.). Accordingly, no ovens or lengthy drying times are required for sufficient curing to achieve the desired tensile strengths for handling the molding assembly. The adhesives can be supplied to the end user with differing cure times in order to accommodate different job requirements. In this regard, higher temperatures will shorten gel and cure times while colder temperatures will extend gel and cure times. Colder temperatures also may increase viscosity so care must be taken not to unduly restrict flow through pumping mechanisms and applicator conduits.

The tensile strength of the cured adhesive paste of the invention is generally stronger than the binder composition used to form cores and mold pieces from a sand aggregate. Thus, the molding assemblies can be handled without failure of the adhesive paste. Similarly, core and other washes of the foundry shapes will not adversely effect the tensile strength of the adhesive joint. Such high tensile strengths can be achieved within minutes to fractions of an hour, depending on the cure time selected. The tensile strength is high enough to eliminate the need for mechanical fasteners or weights. The rapid cure times available significantly improved productivity of the foundry operation. The adhesive paste will not resoften during post assembly operations such as washing and oven drying.

Virtually all types of cores and molds can be assembled with the adhesive paste. Examples of typical foundry binder and aggregates used in making molds and cores are show in U.S. Pat. Nos. 3,409,579; 3,676,392; 4,127,157; 4,226,626; 4,526,219; and 4,780,489, all of which are incorporated into this disclosure by reference. These cores and molds can be almost of any size or shape. The molding assemblies made from these foundry shapes might include impeller core assemblies, cylinder block barrel core assemblies, oil pump core assemblies, water jacket core assemblies, and intake manifold core assemblies for combustion engines.

EXAMPLES

Examples 1 illustrates the preparation of a typical prepolymer while example 2 illustrate the preparation of curative. Example 3 describes a Part I and Part II for an adhesive paste. Example 4 illustrates the use of the Part I and Part II to hold two foundry molds together in an assembly.

EXAMPLE 1

Example 1 describes the preparation of a typical prepolymer. A prepolymer is made by adding, with a nitrogen purge, 100 parts of polypropylene oxide ether diol of 1000 molecular weight (Olin Poly-G 20–56 polyol, Olin Chemicals, Stamford, Conn.) followed by 54.4 parts dry Mistron RCS talc (Cyprus Industrial Minerals Company, Los Angeles, Calif.) with stirring and heating at 100° C. to 110° C. The wetted mix is sheared at high speed for 30 minutes. The temperature is then stabilized at 60° C. followed by one hour of vacuum heating at 26 inches mercury (30 inches mercury being full vacuum on the production gauge). Then, a mixture of 30.9 parts of Mondur MRS isocyanate and 54.2 parts of Isonate 143L isocyanate is added. The components are allowed to react under vacuum at 80°–90° C. until the isocyanate content reached the theoretical value of 8.6%. A last component, 0.43 parts of zinc stearate, was then added. After about ten minutes of mixing the prepolymer is discharged. The finished product is transferred to a bucket and sealed under a nitrogen atmosphere. The viscosity of the prepolymer of the adhesive paste is 27,000±5000 centipoise at 25° C.

EXAMPLE 2

Example 2 describes the preparation of a curative component. A curative is prepared by charging 34.9 parts Pluracol PeP 550 polyether tetrol of 5000 molecular weight (BASF Wyandotte Corporation, Parsippany, N.J.) and 18.8 parts Pluracol 355 polyether tetrol of 500 molecular weight (BASF Wyandotte Corporation) to a reactor fitted with a lid, stirrer and degassing outlet.

The polyols are heated to 100°–110° C. with stirring. Toluene diisocyanate in the amount of 1.3 parts, 3.5 parts Aerosil fumed silica thickening agent (Degussa Inc., New York, N.Y.), and 0.27 parts Stantone HCC 6783 green coloring agent are added sequentially; allowing time for each material to be dispersed uniformly in the mix. The mixture is degassed at 3 mm mercury for two hours. Anhydrous piperazine in the amount of 1.0 part (Texaco Chemical Co., Houston, Tex.) and triethylenediamine catalyst in the amount of 0.27 parts are added. The temperature is adjusted to 80° C. and the product was degassed for an additional 12 minutes. The viscosity of the curative component of the adhesive paste is 10,000±1,500 centipoise at 25° C.

EXAMPLE 3

This examples illustrates the use of the prepolymer of Example 1 and the curative of Example 2 to form an adhesive paste which is used to hold foundry shapes in an assembly. The Part I and Part II contain the following components in the amounts specified:

| Component | Amount |
| --- | --- |
| PART I | |
| Prepolymer of Example 1 | 77.3 |
| Talc | 22.6 |
| Zinc stearate | 0.03 |
| PART II | |
| Curative of Example 2 | 89.0 |
| AEROSIL 200 | 9.5 |
| DABCO amine catalyst | 1.25 |
| Pigment | 0.25 |

EXAMPLE 4

Part I and Part II are mixed simultaneously by using a Supermix II applicator gun available from Liquid Control Corporation. This applicator is a completely portable applicator system for mixing and applying the adhesive paste. It is a high pressure dispense gun utilizing a single cartridge with two separate chambers, one for the Part I and the other for the Part II, and having a mixing tube downstream of these two chambers.

The adhesive paste is easily mixed in the Supermix II in a one to one ratio of Part I and the Part II, and ejected between two adjoining surfaces of two molds having an approximate weight of 3 to 4 pounds, and is made by mixing 1.5 weight percent of PEPSET no-bake foundry binder with Manley sand. The molds were joined together in an assembly and left to set until the paste cures minutes.

The gel time of the paste is 2 minutes and the work time is 7 minutes as measured by the Intellect 500 tensile tester. The tensile strength holding the two molds together is greater than the original bond strength holding the molds together. An iron casting is made with the mold. No casting defects are observed.

I claim:

1. A process of casting a metal comprising:
   A. fabricating a molding assembly by applying an adhesive paste to at least two foundry shapes, wherein said shapes are made of foundry aggregate held together with a foundry binder, so as to bond said foundry shapes together as a molding assembly, wherein the adhesive paste comprises:
      I. a solventless Part I component comprising:
         A. a prepolymer having from 3–15 percent free isocyanate groups comprising the reaction product of a polyol and an aromatic polyisocyanate;
         B. an aliphatic polyisocyanate; and
         C. a thixotropic filler; and
      II. a solventless Part II component comprising a curative comprising:
         (1) a polyether polyol;
         (2) a diamine; and
         (3) a thixotropic filler, such that the amount of filler in the Part I and Part II is sufficient to increase the viscosity of the Part I and the Part II from 4,000 to 40,000 cps at 25° C.
   B. pouring said metal while, in the liquid state, into or around said molding assembly;
   C. allowing said metal to cool and solidify so as to provide a formed metal article; and
   D. separating said metal article from said molding assembly.

2. The process of claim 1 wherein the desired weight ratio of the prepolymer of the Part I to the curative of the Part II is about 4:1.

3. The process of claim 2 wherein the amount of the filler in the Part I component is from 4 to 11 weight percent, said weight percent based upon the total weight of the Part I component, and the amount of filler in the Part II component is from 15 to 30 weight percent, said weight percent based upon the total weight of the Part II component.

4. The process of claim 3 wherein the prepolymer of adhesive of the Part I component is prepared by the reaction of a polyol having a molecular weight of 1000 to 3500 which is reacted with an organic polyisocyanate such that it contains from 7 to 10 percent free isocyanate.

* * * * *